United States Patent [19]
Maki et al.

[11] 3,816,178
[45] June 11, 1974

[54] ALKALINE STORAGE BATTERY HAVING ZINC ELECTRODE

[75] Inventors: Yoshiyuki Maki, Fujisawa; Masaru Fujita, Higashitoyoda; Hideo Takahashi, Yokohama; Tetsuo Ino, Maebashi, all of Japan

[73] Assignees: Hitachi, Ltd.; The Tokyo Electric Power Co., both of Tokyo, Japan

[22] Filed: Apr. 13, 1971

[21] Appl. No.: 133,596

[30] Foreign Application Priority Data
Apr. 17, 1970  Japan................................ 45-32324

[52] U.S. Cl. .................................................. 136/30
[51] Int. Cl. .......................................... H01m 43/02
[58] Field of Search................ 136/30, 31, 125–130; 106/296, 297, 292

[56] References Cited
UNITED STATES PATENTS

| 440,232 | 11/1890 | Martin | 106/296 |
|---|---|---|---|
| 2,213,168 | 8/1940 | Monk et al. | 106/297 |
| 2,987,567 | 6/1961 | Freas et al. | 136/30 |
| 3,028,250 | 4/1962 | Dunn | 106/296 |
| 3,060,254 | 10/1962 | Uny | 136/30 |
| 3,072,495 | 1/1963 | Pitrot | 106/297 |
| 3,427,203 | 2/1969 | Fletcher | 136/125 |
| 3,440,104 | 4/1969 | Huber | 136/125 |
| 3,516,862 | 6/1970 | Van der Grinten | 136/30 |
| 3,553,027 | 1/1971 | Oswin et al. | 136/30 |
| 3,580,740 | 5/1971 | James | 136/30 |
| 3,607,409 | 9/1971 | Hamlen | 136/30 |
| 3,639,176 | 2/1972 | Nordblom et al. | 136/30 |

Primary Examiner—A. B. Curtis
Assistant Examiner—C. F. LeFevour
Attorney, Agent, or Firm—Craig & Antonelli

[57] ABSTRACT

A zinc electrode containing both of calcium and lead is a most suitable negative electrode for an alkaline storage battery and has excellent charge-discharge characteristics.

10 Claims, 4 Drawing Figures

ALKALINE STORAGE BATTERY HAVING ZINC ELECTRODE

This invention relates to an alkaline storage battery having a zinc electrode, particularly to an improvement in or relating to said zinc electrode. More particularly, the invention pertains to an alkaline storage battery having a zinc electrode in which suitable amounts of a calcium compound such as, for example, calcium hydroxide or calcium oxide, and a lead powder or a lead compound such as, for example, lead hydroxide or lead oxide have been added to zinc oxide used as a negative activator, thereby elevating the utilization ratio of zinc contributing to the charge-discharge of the battery to increase the discharge capacity thereof as well as to make the life thereof longer.

As is well known, an alkaline storage battery having a zinc electrode indicates a battery containing zinc as a negative activator and an alkaline electrolyte solution such as aqueous potassium hydroxide solution, and includes, for example, Ag-Zn type cells, Air-Zn type cells and Ni-Zn type cells. This kind of alkaline battery containing zinc as a negative activator has attracted public attention because of its being light in weight and high in energy density per unit weight of the battery as compared with a lead battery. However, the alkaline battery has such great drawbacks that it is difficultly charged and short in life.

That is to say, it is ordinary that the conventional alkaline storage battery having a zinc electrode is greatly deteriorated in discharge capacity when repeatedly subjected to charge-discharge of 30 to 50 cycles. Accordingly, the alkaline battery is far lower in practical applicability than the lead battery.

When the conventional alkaline battery is discharged, the zinc used as the negative electrode is oxidized to form a zincate ion ($ZnO_2^{--}$) and is dissolved in the electrolyte solution, as is well known. In charging the said battery, therefore, the zinc dissolved in the electrolyte solution should be electro-deposited on the surface of the negative substrate consisting of an alkaline-proof conductive plate or net. Due to the properties peculiar to zinc, however, the electrodeposited zinc is in the form of dendritic or spongy crystals growing in the direction of the positive electrode, so that the crystals contact with the positive electrode to cause local short-circuits, or the electrode plate is damaged due to the short-circuits. Thus, the electrodeposited zinc crystals have been causes for great deterioration in characteristics of the battery.

In order to overcome such drawbacks as mentioned above, various studies have heretofore been made with respect to changing procedures, charging means, battery structures, electrolyte compositions, etc. However, all these studies are not beyond the confines of laboratory scale experiments and are low in practicality. Further, Russian Patent No. 116,812, for example, discloses such a zinc electrode that an alkaline earth metal such as calcium has been added to the zinc electrode, and the zincate ion formed due to discharge is immediately reacted with said additive to form a sparingly soluble compound in the electrolyte solution and, at the time of charging, the said compound is reduced to deposit the zinc on the negative substrate. In addition thereto, there have been investigated several batteries in which lead is utilized as an additive for zinc electrodes of Ag-Zn type cells. However, all these batteries are short in charge-discharge cycle life, and none of them has ever been put into practical use.

The present invention has been established in order to overcome such drawbacks of conventional batteries as mentioned above.

An object of the present invention is to provide an excellent alkaline storage battery having a zinc electrode incorporated with a calcium compound and lead or an inorganic lead compound.

Another object of the invention is to provide a zinc electrode having excellent charge-discharge characteristics.

The present inventors made extensive studies on various additives to be incorporated into zinc electrodes to find that a combination of a calcium compound such as calcium hydroxide or calcium oxide with lead or an inorganic lead compound such as lead hydroxide or lead oxide has particularly excellent charge-discharge characteristics. As mentioned previously, the independent use of each of said additives has already been well known. However, a zinc electrode incorporated with suitable amounts of said two additives has prominent charge-discharge characteristics, which have never been expected from the conventional zinc electrodes, as mentioned later.

The above-mentioned zinc electrode of the present invention is prepared, for example, by mixing zinc oxide with calcium hydroxide and lead powder, kneading the resulting mixture with water, an electrolyte or an aqueous solution of a suitable binder such as polyvinyl alcohol, carboxymethyl cellulose or methyl cellulose to form the mixture into a pasty composition, coating the pasty composition on a negative substrate composed of a plate or net of an alkaline-proof metal such as iron or nickel, and then reducing the composition by electrolytic reduction in an alkaline electrolyte solution. The amounts of said additives to be mixed with zinc oxide are such that the amount of the calcium compound is 0.25 to 1.5 moles, preferably 0.5 to 1.0 mole, per mole of zinc oxide, and the amount of lead or the lead compound is 0.05 to 25 percent, preferably 0.1 to 20 percent, by weight based on the weight of the mixture of said zinc oxide and calcium compound.

In the accompanying drawings.

Figure 3:
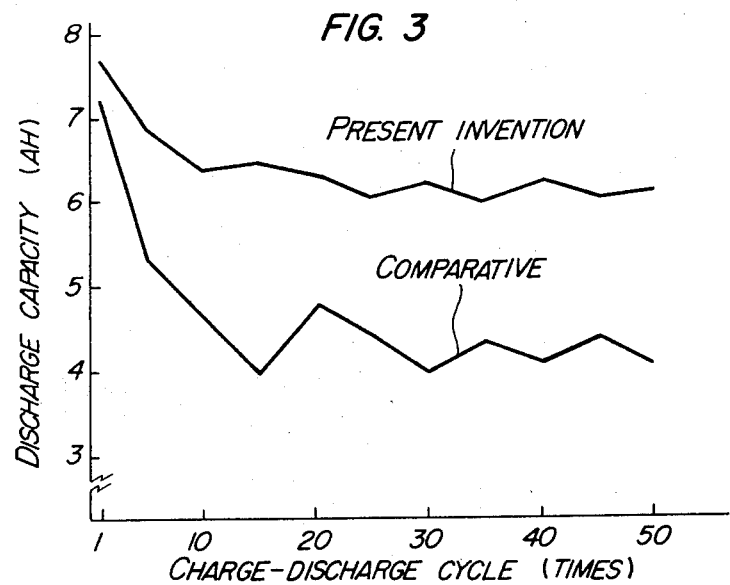
Figure 4:
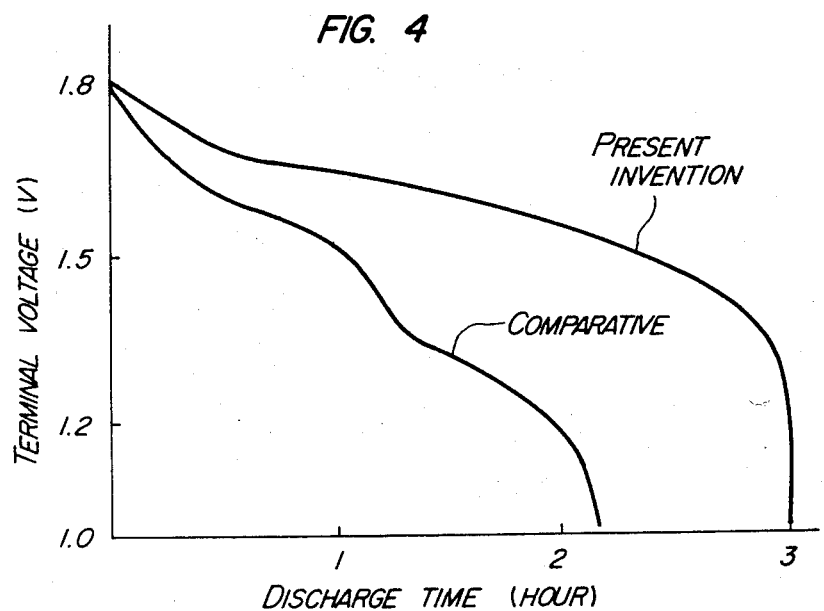

FIG. 3 is a graph showing the relation between discharge capacity and charge-discharge cycle of a storage battery of the present invention, in comparison with that of a conventional storage battery; and FIG. 4 is a graph showing the discharge characteristics of a storage battery of the present invention after repeating the charge-discharge thereof 50 times, in comparison with those of a conventional storage battery having a zinc electrode incorporated with only lead.

The present invention is illustrated in further detail below with reference to preferred embodiments.

Table 1 shows the relation between the amount of calcium hydroxide used and the number of charge-discharge cycles which is a standard for representing the life of a storage battery.

The structures of the batteries used for the measurement of charge-discharge cycles were as follows:

A zinc electrode was prepared in such a manner that a pasty mixture of zinc oxide and calcium hydroxide was coated on an iron plate used as a negative substrate, and then reduced by electrolytic reduction in an alkaline electrolyte solution. As positive electrodes, there were used two sheets of sintered nickel oxide plates, and the above-mentioned zinc electrode was inserted between the two plates. As the electrolyte, there was used a 15 percent aqueous potassium hydroxide solution saturated with zinc oxide.

The measurement of charge-discharge cycle was carried out in such a manner that the above-mentioned battery was charged with 120 percent of the amount of discharge electricity by application of a charging current of 5 HR (Hour Rate) and then discharged 5 HR. Thus, complete charge-discharge tests were effected.

Table 1

| Zinc electrode composition Ca(OH)$_2$/ZnO (molar ratio) | Charge-discharge cycle (times) |
|---|---|
| 0 | 32 |
| 0.25 | 120 |
| 0.5 | 330 |
| 0.75 | 447 |
| 1.0 | 421 |
| 1.5 | 205 |
| 2.0 | 61 |

As is clear from the above table, there is a close relation between the amount of calcium hydroxide added and the life of battery. That is, when the molar ratio is in the range of 0.25 to 1.5, a charge-discharge cycle of more than 120 times can be attained, and when the molar ratio is in the preferable range of 0.5 to 1.0, a charge-discharge cycle of more than 330 times can be attained.

Table 2 shows the relation between the initial discharge capacity of a battery having a zinc oxide electrode incorporated with calcium hydroxide in combination with a lead powder and the discharge capacity of said battery after repeatedly subjected 100 times to charge-discharge cycle test.

The structures of the batteries used for the measurement were substantially identical with those in the case of Table 1. In each sample, however, the theoretical quantity of electricity of zinc coated on the negative substrate was 10 AH (ampere-hour), the mixing molar ratio of calcium hydroxide to zinc was unified to 0.74, and one member of lead powder, lead oxides and lead hydroxide was added as a lead material to the mixed electrode. The measurement of discharge capacity was effected in such a manner that the battery was charged with 120 percent of the quantity of discharge electricity by application of a charging current of 5 HR and then discharged to a terminal voltage of 0.5 V under 2 HR.

Table 2

| Additive | Amount of additive (wt%) | Initial discharge capacity (AH) | Discharge capacity after repeating 100 times (cycles) of the charge-discharge (AH) |
|---|---|---|---|
| None | — | 6.5 | 4.9 |
|  |  | 6.3 | 4.5 |
| Pb (Lead powder) | 0.05 | 6.5 | 5.0 |
|  | 0.1 | 6.8 | 5.6 |
|  | 1.0 | 9.2 | 7.0 |
|  | 5.0 | 8.6 | 7.1 |
|  | 10.0 | 8.4 | 6.5 |
|  | 20.0 | 8.3 | 6.6 |
|  | 25.0 | 8.2 | 5.0 |
| Pb$_3$O$_4$ (Trilead tetroxide) | 0.05 | 7.3 | 5.5 |
|  | 0.1 | 7.8 | 5.8 |
|  | 1.0 | 9.3 | 7.2 |
|  | 5.0 | 8.5 | 6.9 |
|  | 10.0 | 8.0 | 7.0 |
|  | 20.0 | 7.9 | 6.0 |
|  | 25.0 | 7.5 | 5.7 |
| PbO$_2$ (Lead peroxide) | 0.05 | 6.7 | 5.0 |
|  | 0.1 | 6.9 | 5.0 |
|  | 1.0 | 7.8 | 6.2 |
|  | 5.0 | 8.8 | 6.9 |
|  | 10.0 | 8.8 | 7.0 |
|  | 20.0 | 7.9 | 5.7 |
|  | 25.0 | 7.0 | 5.3 |
| Pb(OH)$_2$ (Lead hydroxide) | 0.05 | 6.8 | 5.0 |
|  | 0.1 | 7.0 | 5.1 |
|  | 1.0 | 8.7 | 6.8 |
|  | 5.0 | 7.5 | 6.7 |
|  | 10.0 | 8.0 | 6.7 |
|  | 20.0 | 7.0 | 5.3 |
|  | 25.0 | 6.8 | 5.0 |

From the above table, it is understood that a battery having a mixed electrode comprising zinc oxide and calcium hydroxide, which has been incorporated with a lead powder or a lead compound such as lead oxide or lead hydroxide, is about 25 percent greater in initial discharge capacity than in the case where no such additive has been incorporated. Further, the above-mentioned battery is comparable in discharge capacity after repeating 100 times of charge-discharge to the conventional battery, and is 20 to 30 percent greater in said discharge capacity when the amount of additive incorporated has been suitable. As is clear from Table 2, the amount of lead to be incorporated is 0.05 to 25.0 percent by weight, preferably 0.1 to 20.0 percent by weight.

Figure 1:
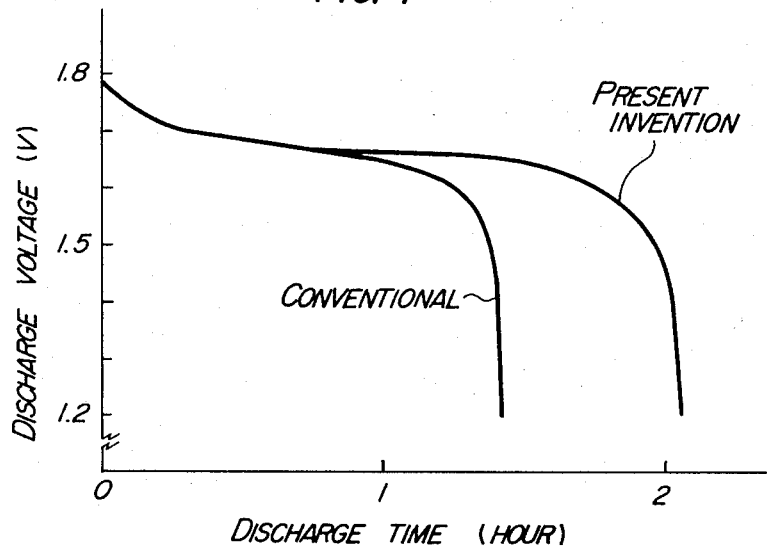
FIG. 1 is a graph showing the discharge characteristics of a storage battery of the present invention after repeating 100 times of the charge-discharge, in comparison with those of a conventional storage battery.

FIG. 1 shows the discharge characteristics after repeating 100 times of charge-discharge of a battery of the present invention which has a so-called zinc-calcium-lead ternary system negative electrode incorporated with 1 percent by weight of the trilead tetroxide (Pb$_3$O$_4$) set forth in Table 2, in comparison with those of a conventional battery having a so-called zinc-calcium binary system negative electrode incorporated with no such trilead tetroxide.

Figure 2:
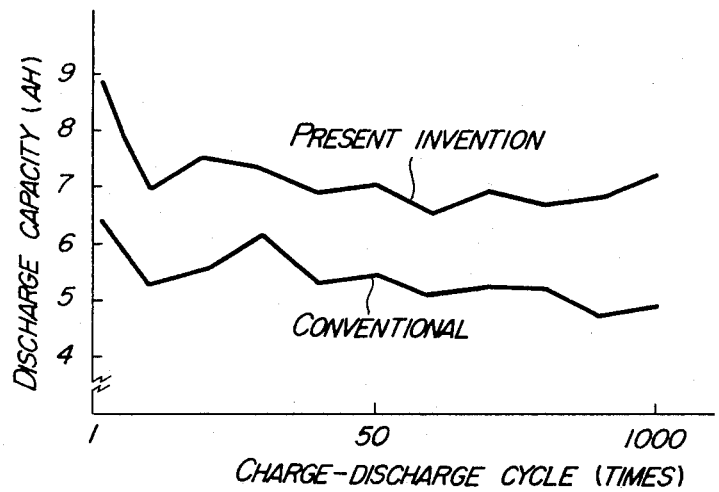
FIG. 2 is a graph showing, in terms of the relation between discharge capacity and charge-discharge cycle, the life test results of a storage battery of the present invention, in comparison with those of a conventional storage battery.

FIG. 2 is a graph showing the relation between discharge capacity and charge-discharge cycle of the same battery as shown in FIG. 1.

FIGS. 3 and 4 are individually a graph showing the relation between discharge capacity and charge-discharge cycle, and the discharge characteristics after repeating 50 times of charge-discharge, of a battery of the present invention having a zinc-calcium-lead ternary system negative electrode prepared by incorporating calcium oxide and lead into zinc oxide, and of a conventional battery having a zinc-lead binary system negative electrode prepared by incorporating only lead into zinc oxide. The structures of batteries used for measurement and the measurement conditions were as follows:

The structures of batteries were substantially identical with those of the batteries used in the case of FIGS. 1 and 2, and the amount of zinc coated on the negative substrate was so unified that the amount of zinc oxide became 15.2 g, which corresponded to 10 AH. In the conventional battery, there was used a zinc-lead binary system electrode prepared by incorporating 1 g (about 6.7 percent by weight ratio) of trilead tetroxide to the zinc oxide, while in the battery of the present invention, there was used a zinc-calcium-lead ternary system electrode prepared by incorporating 1 g (about 4 percent by weight ratio) of trilead tetroxide to a mixture comprising 1 mole of zinc oxide and 0.75 mole of calcium hydroxide. The measurement conditions adopted in the case of FIG. 3 were such that each battery was charged with 120 percent of the quantity of discharge electricity by application of a charging current of 5 HR, and the discharge was effected with a constant resistance of 0.75 Ω until the terminal voltage was lowered to 0.5 V. The termination voltage at the time of discharge capacity measurement was 1.0 V.

As is clear from FIGS. 1 to 4, the alkaline storage battery of the present invention having a zinc-calcium-lead ternary system electrode is far more excellent in voltage characteristics and discharge capacity-charge-discharge cycle characteristics than the conventional battery having a binary system electrode incorporated with only calcium or lead. From Table 2 and FIGS. 2 and 3, it is clear that the electrode of the present invention is not only greater in initial discharge capacity than the conventional electrode and hence is larger as much in amount of zinc contributing to discharge, but also has stabilized charge-discharge characteristics over a long period of time.

Thus, in accordance with the present invention, charge-discharge characteristics, which have never been expected hitherto, can be attained by use of calcium hydroxide in combination with lead, and the synergistic effect provided by use of said two additives is extremely great.

While lead powder and such lead compounds as lead oxides and lead hydroxide have been used as lead additives in the above, these are substantially equivalent in effectiveness.

In the present invention, calcium oxide (CaO) may also be used in place of calcium hydroxide. As is well known, calcium oxide can be easily hydrolyzed through exothermic reaction to fine calcium hydroxide, so that in the case where a calcium compound is desired to be kneaded with zinc oxide and lead powder or inorganic lead compound to form a pasty composition, the use of calcium oxide is more advantageous than the use of calcium hydroxide.

The above-mentioned embodiments have been directed to the case of a so-called Ni-Zn type storage battery, in which a 15 percent aqueous potassium hydroxide solution saturated with zinc oxide is used as the electrolyte and a sintered nickel oxide plate is used as the positive electrode. However, it is needless to say that the same effects as in the above embodiments can be attained when the zinc electrode of the present invention is applied to an air-Zn type battery, an Ag-Zn type battery or the like secondary battery containing zinc as a negative activator. Further, the electrolyte may be used at an ordinary concentration (30 percent or more), but favorable results can be obtained when it is used at such a relatively low concentration as 5 to 20 percent.

As mentioned above, an alkaline storage battery having the zinc electrode of the present invention is far more excellent in voltage characteristic, discharge capacity and the like properties than the conventional products. Furthermore, the use of the electrode of the present invention gives such advantages that a zincate ion, which is the discharge product thereof, immediately reacts with the kneaded calcium to form a compound sparingly soluble in the alkaline electrolyte, so that the said discharge product is scarcely dissolved in the electrolyte to make it possible to markedly decrease, as compared with the case of a conventional electrode of the kind in which the zincate ion is dissolved in the electrolyte at the time of discharging, various troubles of electrodeposition state of zinc at the time of charging which are derived from the properties inherent to zinc, with the result that various equipments, which have heretofore been provided in order to improve the deposition state of zinc, become unnecessary.

What is claimed is:

1. An alkaline storage battery comprising a container, a positive electrode, a negative electrode and an alkaline electrolyte solution, wherein said negative electrode comprises an alkaline-proof conductive substrate and a pasty mixture coated thereon, said mixture consisting essentially of zinc oxide and about 0.25 to 1.5 moles per mole of zinc oxide of at least one calcium compound selected from the group consisting of calcium hydroxide and calcium oxide as main components, said mixture further including by weight with respect to said main components at least one of about 0.1 to about 20 percent lead, about 0.1 to about 25 percent trilead tetroxide, about 1 to 20 percent lead peroxide and about 1 to 10 percent lead hydroxide.

2. An alkaline storage battery according to claim 1, wherein said calcium compound is calcium hydroxide.

3. An alkaline storage battery according to claim 1, wherein said calcium compound is calcium oxide.

4. An alkaline storage battery according to claim 1, wherein said mixture includes about 0.1 to about 20 percent lead.

5. An alkaline storage battery according to claim 1, wherein said member includes about 0.1 to about 25 percent trileadtetroxide.

6. An alkaline storage battery according to claim 1, wherein said mixture includes about 1 to about 20 percent lead peroxide.

7. An alkaline storage battery according to claim 1, wherein said mixture contains about 1 to about 10 percent lead hydroxide.

8. An alkaline storage battery according to claim 1, wherein said electrolyte solution is a 5 to 50 percent aqueous solution of potassium hydroxide.

9. An alkaline storage battery according to claim 1, wherein said mixture contains from 0.5 to 1.0 moles of at least one calcium compound.

10. An alkaline storage battery according to claim 1, wherein said mixture further includes a binder selected from the group consisting of polyvinyl alcohol, carboxymethyl cellulose and methyl cellulose.

* * * * *